(12) United States Patent
Yamamoto et al.

(10) Patent No.: US 7,454,401 B2
(45) Date of Patent: Nov. 18, 2008

(54) REPRODUCING APPARATUS AND METHOD, INFORMATION PROCESSING APPARATUS AND METHOD, RECORDING MEDIUM, AND PROGRAM

(75) Inventors: Noriyuki Yamamoto, Tokyo (JP);
Kazunori Ohmura, Kanagawa (JP)

(73) Assignee: Sony Corporation, Tokyo (JP)

( * ) Notice: Subject to any disclaimer, the term of this patent is extended or adjusted under 35 U.S.C. 154(b) by 326 days.

(21) Appl. No.: 10/279,430

(22) Filed: Oct. 24, 2002

(65) Prior Publication Data
US 2003/0093422 A1 May 15, 2003

(30) Foreign Application Priority Data
Oct. 26, 2001 (JP) .............................. 2001-329838

(51) Int. Cl.
*G06F 17/30* (2006.01)
(52) U.S. Cl. ..................... 707/1; 707/104.1; 455/3.06
(58) Field of Classification Search ........... 707/1–104.1
See application file for complete search history.

(56) References Cited

U.S. PATENT DOCUMENTS

| | | | | | |
|---|---|---|---|---|---|
| 5,550,965 | A | * | 8/1996 | Gabbe et al. ................ | 715/512 |
| 5,619,425 | A | * | 4/1997 | Funahashi et al. ........... | 709/219 |
| 6,083,009 | A | * | 7/2000 | Kim et al. ................ | 434/307 A |
| 6,122,617 | A | * | 9/2000 | Tjaden ........................ | 704/260 |
| 6,601,074 | B1 | * | 7/2003 | Liebenow ................ | 707/104.1 |
| 6,681,120 | B1 | * | 1/2004 | Kim ........................ | 455/556.1 |
| 6,748,360 | B2 | * | 6/2004 | Pitman et al. ............... | 704/270 |
| 6,782,419 | B2 | * | 8/2004 | Tobita et al. ................ | 709/219 |
| 6,813,395 | B1 | * | 11/2004 | Kinjo ........................ | 382/305 |
| 6,874,003 | B2 | * | 3/2005 | Morohashi .................. | 707/204 |
| 6,990,312 | B1 | * | 1/2006 | Gioscia et al. ............. | 455/3.06 |
| 7,099,894 | B2 | * | 8/2006 | Ouchi et al. ............. | 707/104.1 |
| 2002/0059120 | A1 | * | 5/2002 | Milton ........................ | 705/28 |
| 2002/0062313 | A1 | * | 5/2002 | Lee et al. ........................ | 707/3 |
| 2003/0033214 | A1 | * | 2/2003 | Mikkelsen et al. ............ | 705/26 |
| 2003/0103149 | A1 | * | 6/2003 | Kinjo et al. ............. | 348/231.5 |
| 2004/0093352 | A1 | * | 5/2004 | Matsumoto ............. | 707/104.1 |
| 2004/0214525 | A1 | * | 10/2004 | Ahn et al. .................. | 455/41.2 |

OTHER PUBLICATIONS

Shmeiderman et al, Direct AnnotationaL A Drag-and-Drop Strategy for Labeling Photos, Proc. International Conference Information Visualization (IV 2000), London, England, pp. 1-10.*

* cited by examiner

*Primary Examiner*—Debbie M Le
(74) *Attorney, Agent, or Firm*—Finnegan, Henderson, Farabow, Garrett & Dunner, L.L.P.

(57) ABSTRACT

A reproducing apparatus includes retrieving means for retrieving contents data from an electronic apparatus. The reproducing apparatus further includes reproducing means for reproducing the contents data retrieved from the electronic apparatus. The reproducing apparatus gathers episode information including information associated with the electronic apparatus about a reproduction episode of the contents data by the reproducing means, and stores the episode information in relationship with the contents data. The episode information includes information about a person or apparatus located near a user during at least part of the reproduction episode. The episode information may then be used to retrieve contents data.

18 Claims, 10 Drawing Sheets

FIG. 2
SCENE 1
12:00, October 14, 2001
Listen to music recorded on Mary's MD player with Mary in Kaihin Park.
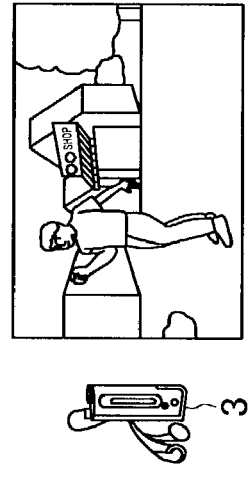
SCENE 2
15:30, October 14, 2001
Listen to music recorded on John's portable player in Station Street Shopping Center.
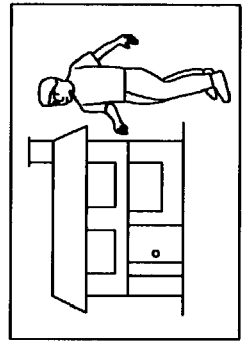
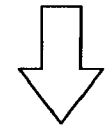
SCENE 3
18:00, October 14, 2001
Go back home.
SCENE 4
22:00, October 14, 2001
Listen to music again John listened with Mary at noon, in living room of his home.
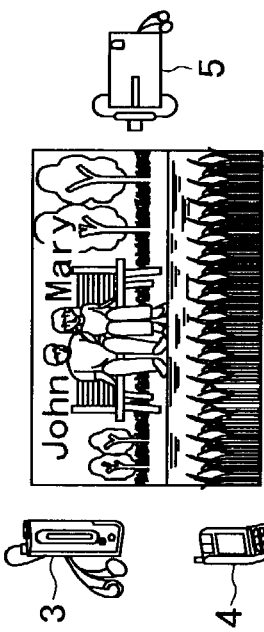
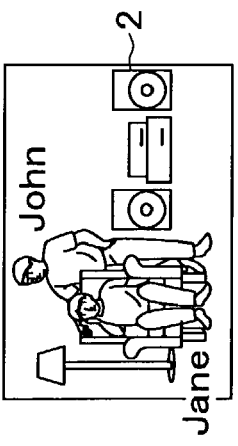

F I G. 8

| EVENT DATE AND TIME | LOCATION | MUSIC ID | MUSIC TITLE | SOURCE APPARATUS | REPRODUCING APPARATUS | PERSONAGE |
|---|---|---|---|---|---|---|
| 2001/10/14 12:00 | Kaihin Park | — | EVERYDAY | MD player | Portable player | Mary |
| 2001/10/14 12:15 | Kaihin Park | — | I'm tired | MD player | Portable player | Mary |
| 2001/10/14 15:30 | Station street shopping center | ME12345D | — | Portable player | Portable player | — |
| 2001/10/14 22:00 | Living room of my home | — | I'm tired | Contents provider site | Component stereo set | Jane |
| 2001/10/14 22:30 | Living room of my home | ME12345D | — | Portable player | Component stereo set | Jane |

FIG. 10

| EVENT DATE AND TIME | LOCATION | PERSONAGE | MUSIC ID | MUSIC TITLE | SOURCE APPARATUS | REPRODUCING APPARATUS |
|---|---|---|---|---|---|---|
| 2001/10/10 | | | | | | |
| 2001/10/12 | | | | | | |
| 2001/10/14 | | | | | | |
| 12:00 | Kaihin Park | Mary | — | EVERYDAY | MD player | Portable player |
| 12:15 | Kaihin Park | Mary | — | I'm tired | MD player | Portable player |
| 15:30 | Station street shopping center | — | ME12345D | — | Portable player | Portable player |
| 22:00 | Living room of my home | Jane | — | I'm tired | Contents provider site | Component stereo set |
| 22:30 | Living room of my home | Jane | ME12345D | — | Portable player | Component stereo set |
| 2001/10/16 | | | | | | |

REPRODUCING APPARATUS AND METHOD, INFORMATION PROCESSING APPARATUS AND METHOD, RECORDING MEDIUM, AND PROGRAM

BACKGROUND OF THE INVENTION

The present invention relates generally to a reproducing apparatus and method, an information processing apparatus and method, a recording medium, and a program and, more particularly, to a reproducing apparatus and method, an information processing apparatus and method, a recording medium, and a program which, by centrally managing the locations of contents data stored in various reproducing apparatuses, allow the sharing of contents data between these reproducing apparatuses.

The number of types of reproducing apparatus for reproducing moving pictures accompanied with voice, music data, text data, and still pictures (hereafter generically referred to as contents data) is on the increase and today it is not an infrequent practice for one person to own plural reproducing apparatuses such as above. Besides, because these reproducing apparatuses have been getting smaller in size and lighter in weight, many users have come to carry these apparatuses with them.

If a single user uses plural reproducing apparatuses, it means that the contents data to be handled by the user are scattered over different reproducing apparatuses. Therefore, unless the information about what contents data are stored in which reproducing apparatus is organized in database by some method, the user must resort to his memory for finding desired data, music A for example. As the number of reproducing apparatuses used by the user increases and the number of pieces of contents data to be handled by the user increases, it becomes more difficult for the user to quickly and correctly locate the desired contents data.

For a method of organizing, into a database, the information about the relationships about contents data and reproducing apparatus in which they are stored, the use of a databases creating application program executable on personal computers may be proposed for example. However, because this requires the user to enter the information about the relationships between contents data and reproducing apparatus in which they are stored, it is difficult for those users who are not well familiar with personal computers to create databases.

Further, if a database exists, searching for desired contents data requires the setting of search conditions and other operations, which is bothersome for ordinary personal computer users.

SUMMARY OF THE INVENTION

It is therefore an object of the present invention to provide a system capable of automatically construct a database associated with contents data stored in plural reproducing apparatuses in a distributed manner and searching for desired contents data in accordance with the search conditions based on user's fragmentary memory.

According to a first aspect of the present invention, there is provided a reproducing apparatus including: reproducing means for reproducing contents data; gathering means for gathering episode information about the reproduction of the contents data by the reproducing means; and storage means for storing the episode information in relationship with the contents data.

Preferably, the reproducing apparatus further includes retrieving means for retrieving the contents data which are to be reproduced by the reproducing means from an electronic apparatus; wherein the gathering means gathers the episode information from the electronic apparatus which retrieved the contents data.

Preferably, the gathering means gathers the episode information which includes information about an owner or user of the electronic apparatus.

Preferably, the information about an owner or user of the electronic apparatus is registered in the electronic apparatus in advance.

Preferably, the information about an owner or user of the electronic apparatus is entered or selected when using the contents data.

Preferably, the gathering means gathers, as the episode information, at least one of an identifier and a name for identifying the contents data, a date and time, a place, reproducing apparatus identifying information, source apparatus identifying information, and accompanying person's name at the time of the reproduction of the contents data.

Preferably, the gathering means gathers the episode information by wireless communication.

Preferably, the gathering means gathers episode information gathered by an other electronic apparatus.

Preferably, the reproducing apparatus further includes setting means for setting a search condition necessary for searching for the contents data; and search means for, by referencing the episode information stored in the storage means, searching for the contents data which matches the search condition set by the setting means.

Preferably, the search means causes an other electronic apparatus to search for the contents data on the basis of the search condition.

Preferably, the reproducing apparatus further includes retrieving means for retrieving the contents data which are to be reproduced by the reproducing means from an electronic apparatus; wherein the retrieving means retrieves the contents data searched for by the search means.

Preferably, the reproducing apparatus further includes presenting means, for presenting, to a user, the episode information about the contents data being reproduced.

Preferably, the reproducing apparatus and the electronic apparatus are portable.

According to a second aspect of the present invention, there is provided a reproducing method including the steps of: reproducing contents data; gathering episode information about the reproduction of the contents data in the reproducing step; and storing the episode information in relationship with the contents data.

Preferably, the reproducing method further includes the step of: retrieving the contents data which are to be reproduced in the reproducing step from an electronic apparatus; wherein the episode information is gathered from the electronic apparatus which retrieved the contents data in the gathering step.

Preferably, the reproducing method further includes the steps of setting a search condition necessary for searching for the contents data; and searching for the contents data which matches the search condition set in the setting step by referencing the episode information stored in the storage step.

Preferably, the reproducing method further includes the step of retrieving the contents data which are to be reproduced in the reproducing step from an electronic apparatus; wherein the contents data searched for in the search step is retrieved in the retrieving step.

Preferably, the reproducing method further includes the step of presenting, to a user, the episode information about the contents data being reproduced.

According to a third aspect of the present invention, there is provided a first recording medium recording a computer-readable program for a reproducing apparatus, the program including the steps of: reproducing contents data; gathering episode information about the reproduction of the contents data in the reproducing step; and storing the episode information in relationship with the contents data.

According to a fourth aspect of the present invention, there is provided a first program for causing a computer to execute the steps of: reproducing contents data; gathering episode information about the reproduction of the contents data in the reproducing step; and storing the episode information in relationship with the contents data.

According to a fifth aspect of the present invention, there is provided an information processing apparatus for accumulating episode information received from a reproducing apparatus, including: communication means for communicating with the reproducing apparatus; accumulating means for accumulating the episode information received from the reproducing apparatus connected by the communication means; search means for searching, by referencing the episode information accumulated by the accumulating means, for the contents data which match a search condition received from the reproducing apparatus connected by the communication means; and supplying means for supplying the contents data searched by the search means to the reproducing apparatus.

Preferably, the communication means communicates with the reproducing apparatus in a wireless connection manner.

Preferably, the supplying means supplies the contents data to the reproducing apparatus by controlling a source apparatus of the contents data.

Preferably, the supplying means retrieves the contents data to supply the same to the reproducing apparatus via a network.

Preferably, the search means also searches for the episode information corresponding to the contents data being reproduced in the reproducing apparatus connected by the communication means and the supplying means also supplies the episode information searched by the search means to the reproducing apparatus.

According to a sixth aspect of the present invention, there is provided an information processing method for an information processing apparatus for accumulating episode information received from a reproducing apparatus, including the steps of: communicating with the reproducing apparatus; accumulating the episode information received from the reproducing apparatus connected in the communication step; searching, by referencing the episode information accumulated in the accumulating step, for the contents data which match a search condition received from the reproducing apparatus connected in the communication step; and supplying the contents data searched in the search step to the reproducing apparatus.

According to a seventh aspect of the present invention, there is provided a second recording medium recording a computer-readable program for accumulating episode information received from a reproducing apparatus, including the steps of: communicating with the reproducing apparatus; accumulating the episode information received from the reproducing apparatus connected in the communication step; searching, by referencing the episode information accumulated in the accumulating step, for the contents data which match a search condition received from the reproducing apparatus connected in the communication step; and supplying the contents data searched in the search step to the reproducing apparatus.

According to an eighth aspect of the present invention, there is provided a second program for causing a computer for accumulating episode information received from a reproducing apparatus to execute the steps of: communicating with the reproducing apparatus; accumulating the episode information received from the reproducing apparatus connected in the communication step; searching, by referencing the episode information accumulated in the accumulating step, for the contents data which match a search condition received from the reproducing apparatus connected in the communication step; and supplying the contents data searched in the search step to the reproducing apparatus.

In the reproducing apparatus and method and the first program, when contents data are reproduced, the episode information about these contents data is gathered and stored. In addition, the stored episode information is transmitted to an other apparatus.

In the reproducing apparatus and method and the second program, episode information received from a connected reproducing apparatus is stored and the contents data which match a search condition received from a connected reproducing apparatus are searched for by referencing the stored episode information. In addition, the retrieved contents data are supplied to the reproducing apparatus.

BRIEF DESCRIPTION OF THE DRAWINGS

These and other objects of the invention will be seen by reference to the description, taken in connection with the accompanying drawing, in which:

FIG. 2 is a diagram illustrating the schema of the contents sharing management system shown in FIG. 1;

FIG. 8 is diagram illustrating exemplary episode information organized into a database stored in the episode server;

FIG. 10 is a diagram illustrating an exemplary operator screen displayed on a display of the episode server for example.

DETAILED DESCRIPTION OF THE PREFERRED EMBODIMENTS

Figure 1:
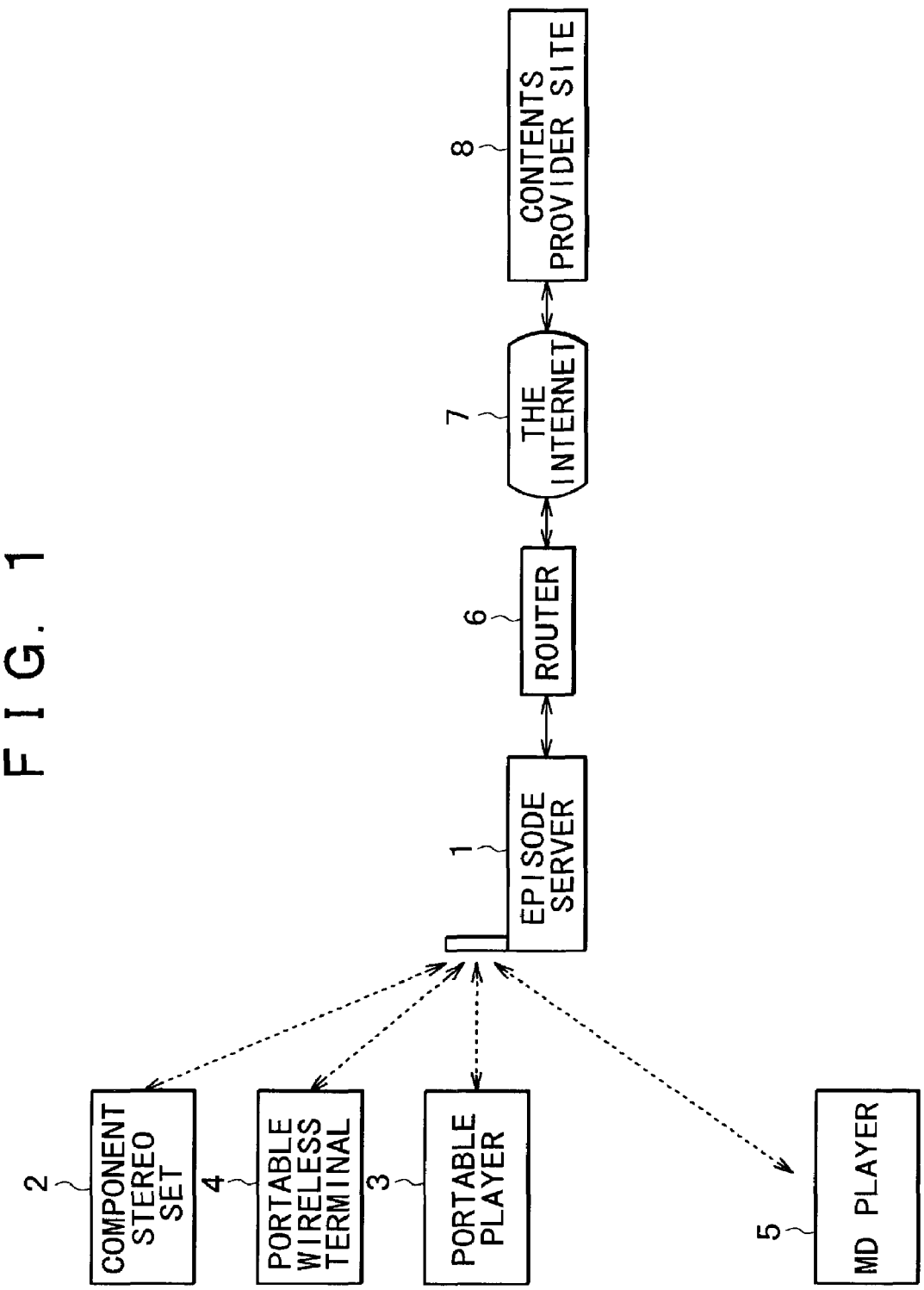
FIG. 1 is a block diagram illustrating an exemplary configuration of a contents sharing management system practiced as one embodiment of the invention.

This invention will be described in further detail by way of example with reference to the accompanying drawings. Now referring to FIG. 1, there is shown an exemplary configuration of a contents sharing management system practiced as one embodiment of the invention.

This contents sharing management system is mainly constituted by an episode server 1 and a plurality of contents reproducing apparatuses. The contents reproducing apparatuses include, for example, a component stereo set 2 installed at user's home, a portable player 3 such as Walkman (trademark) which uses a semiconductor memory such as Memory Stick (trademark) or a disk medium such as MD (Mini Disc) or CD (Compact Disc), a portable wireless terminal 4 such as a mobile phone or a PHS (Personal Handyphone System), and an MD player 5 which is used by other registered users.

It should be noted that, in addition to the above-mentioned apparatuses, the component stereo set 2 through the MD player 5, the contents reproducing apparatuses include a laptop computer, PDA (Personal Digital Assistant), notebook computer, desktop computer, Internet terminal, set-top box, railroad station ticket barrier system, railroad station vendor system, pager, wristwatch, badge, IC card, headset, audio apparatus, video camera, digital still camera, car navigation system, television receiver, radio, printer, and facsimile machine, for example.

The above-mentioned apparatuses, the episode server 1 through the MD player 5, may be interconnected by wireless communication technologies such as Bluetooth (trademark) for example. Other technologies than Bluetooth, such as the 802.11b (wireless LAN) may also be used. This interconnection may also be realized by wired communication technologies such as the IEEE 1394 standard.

The episode server 1 wirelessly connects to any one of the reproducing apparatuses, the component stereo set 2 through MD player 5, that exists within the episode server's wireless communication area, and retrieves the episode information stored in the connected apparatus to store the retrieved information in a database. In addition, the episode server 1 searches the database upon request from any one of the apparatuses, component stereo set 2 through MD player 5, to identify a source apparatus in which the contents data as a result the search are stored, providing the contents data to the search requesting apparatus.

The episode server 1 is connectable, via a router 6, to any site, a contents provider site 8 for example, existing on the Internet. The episode server 1 can supply the contents data retrieved from the contents provider site 8 to the wirelessly connected apparatus, the component stereo set 2 through the MD player 5.

The component stereo set 2 has capabilities of general audio/visual recording/reproducing apparatus for reproducing contents data recorded in recording media such as Memory Stick, CD, MD, and DVD (Digital Versatile Disc) and receiving television and radio programs and capabilities which are realized by an agent program to be described later to wirelessly connect to the episode server 1 to reproduce the contents data supplied from the episode server 1 for example.

It should be noted that, in what follows, the contents data which can be handled by the contents sharing management system associated with the invention are limited to music data for the convenience of description. The music data referred to herein include PCM data, MP3 data, WAVE data, MIDI data and so on from which the audio signals of music can be reproduced by predetermined signal processing, their data formats being not especially limited to any particular ones.

The portable player 3 has capabilities of a general portable player which reproduces the music data recorded on recording media such as Memory Stick, CD, MD, and DVD to output corresponding voice as well as capabilities to be realized by an agent program to be described later of wirelessly connecting to the MD player 5 for example, reproducing music data supplied from the MD player 5, storing the episode information at reproducing the music data, and then, upon connecting to the episode server 1, supplying the stored episode information to the episode server 1.

The portable wireless terminal 4 has capabilities of reproducing music data and acquiring own positional information in addition to general talk capabilities of mobile phones or PHS phones. The portable wireless terminal 4 also has capabilities which are realized by an agent program to be described later; for example, capabilities of wirelessly connecting to the portable player 3 to supply own positional information to the portable player 3.

The MD player 5 has capabilities of which are realized by an agent program to be described later of wirelessly connecting to the portable player 3 to supply music data reproduced by MD player 5 to the portable player 3 and storing episode information at reproducing music to supply the stored episode information to the episode server 1 upon connection thereto, in addition to general MD reproducing capabilities of reproducing music data recorded on an MD to output corresponding voice.

It should be noted that the apparatuses, the episode server 1 through the MD player 5, constituting the contents sharing management system are adapted to prevent them from wirelessly connecting to the apparatuses, the episode server 1 through the MD player 5, of a contents sharing management system which is used third parties outdoors for example by setting user name and group name for example to the device name area of Bluetooth of each of the apparatuses, the episode server 1 through the MD player 5, thereby allowing wireless connection only to those apparatuses with registered user name or group name set.

The following describes one example of the capabilities to be realized by the contents sharing management system associated with invention by explaining the activities of one day of John who is a user of this contents sharing management system.

Referring to FIG. 2, there is shown one example of activities of John on Oct. 14, 2001 (scenes 1 through 4). In scene 1, John is in Kaihin Park with his friend Mary at about 12:00. John has a portable player 3 and a portable wireless terminal 4 and Mary has an MD player 5. John is listening to music of which source apparatus is the MD player 5 by use of the portable player 3. Mary is listening to music reproduced by her MD player 5.

To be more specific, the portable player 3 of John is wirelessly connected to the MD player 5 of Mary, receives music data reproduced by the MD player 5 and wirelessly transmitted therefrom, and outputs corresponding voice from headphones. In correspondence with the outputting of music, the portable player 3 stores episode information such as date and time, and place, title of outputted music, music ID, source apparatus, name of accompanying person (owner of the MD player 5).

The portable player 3 may get the current date and time and place information by identifying the place name (Kaihin Park or Station Street Shopping Center for example) of the current place by matching the current date and time and the coordinate information of the current place computed by a GPS (Global Positioning System) signal receiving circuit 61 (FIG. 5) incorporated in the portable player 3 against the map data recorded in advance (or by inquiring a predetermined server via the Internet 7) or by wirelessly communicating with the portable wireless terminal 4 to use the positional information obtained by the portable wireless terminal 4.

The portable player 3 may get episode information such as music title, music ID, source apparatus, and name of accompanying person from the MD player 5 as with music data or by entering episode information by user John himself by following a predetermined operational procedure.

Scene 2: about 15:30; in Station Street shopping center, John is listening to the music recorded in his portable player 3. To be more specific, the portable player 3 reproduces music data from a recording medium loaded therein and sounds the music data from the headphones. In response to the music reproduction, the portable player 3 stores episode information such as date and time and place, title of reproduced music, music ID, source apparatus.

Scene 3: about 18:00; John returns home in which the episode server 1 is installed. When John gets home, the portable player 3 and the portable wireless terminal 4 gets in the communication area of the episode server 1, upon which the episode server 1 wirelessly connects to the portable player 3 and portable wireless terminal 4 to get the episode information.

Scene 4: about 22:00; John is in his living room with Jane. In this living room, the component stereo set 2 is installed which is wirelessly connected to the episode server 1. If John utters toward the component stereo set 2 "I want to listen to the music which I listened to with Mary this noon" for example, the component stereo set 2 recognizes this voice and requests the episode server 1 for searching the music with the recognized words used as a search condition.

As a result of the search, the episode server 1 identifies the MD player 5 which is the source apparatus of the corresponding music data; however, episode server 1 cannot wirelessly connect to the Mary's MD player 5 because it is outside the communication area. Hence, the episode server 1 gets the music data from the contents provider site 8 via the Internet 7 and wirelessly transmits the music data to the component stereo set 2. The component stereo set 2 reproduces the music data received from the episode server 1, outputting voice. In response to the reproduction of the music, the component stereo set 2 stores episode information such as date and time and place, title of reproduced music, music TD, source apparatus, and name of accompanying person.

It should be noted that other items of episode information than date and time and place, title of reproduced music, music ID, source apparatus, and name of accompanying person stored in each of the apparatuses, the component stereo set 2 through MD player 5, may be used in accordance with the sensors of these apparatuses. For example, episode information may include weather parameters such as temperature, humidity, and atmospheric pressure and such user's physical condition parameters as body temperature, heart rate, perspiration level, blood pressure, and blood sugar level.

Figure 3:
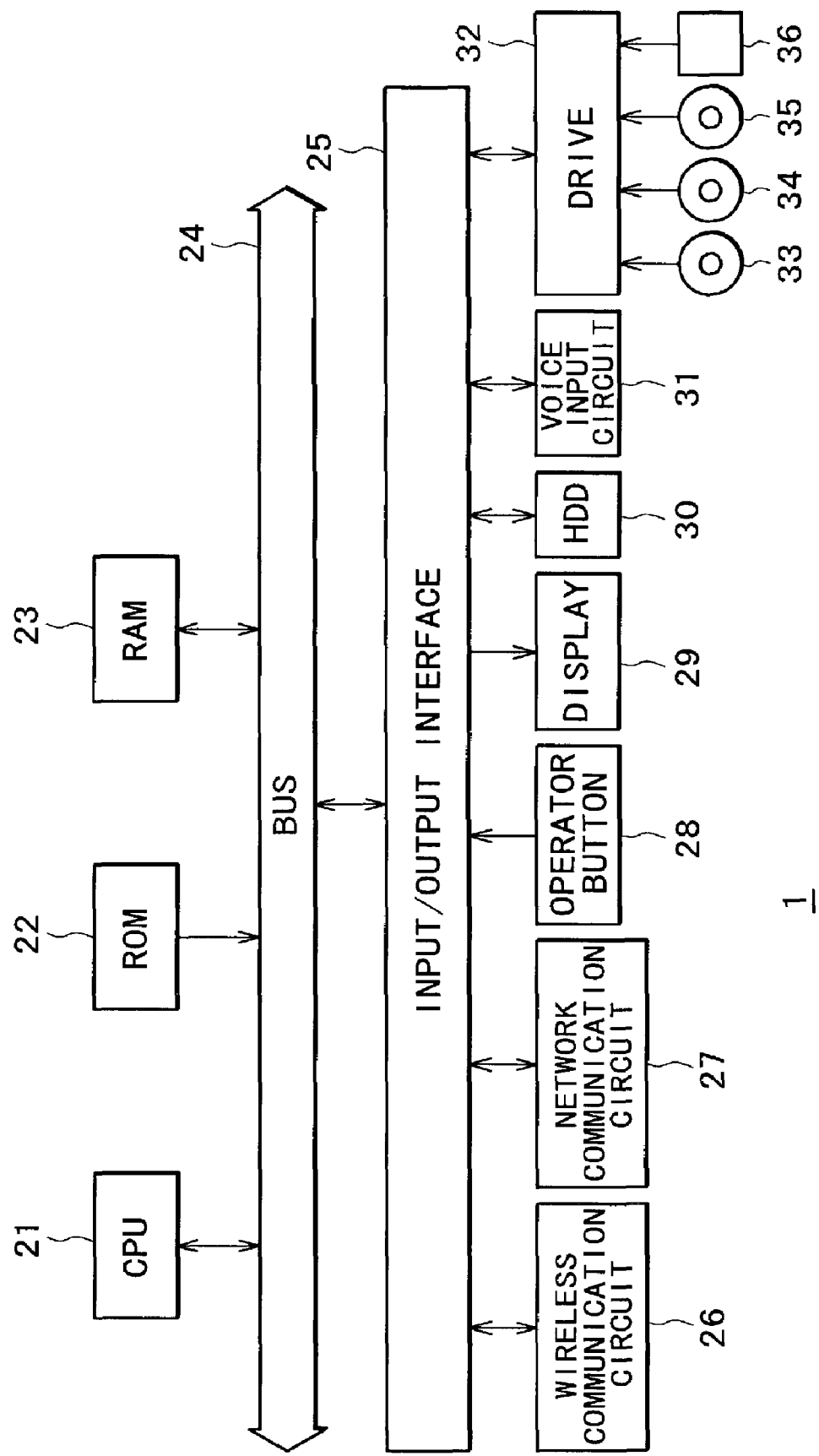
FIG. 3 is a block diagram illustrating an exemplary configuration of an episode server shown in FIG. 1.
Figure 4:
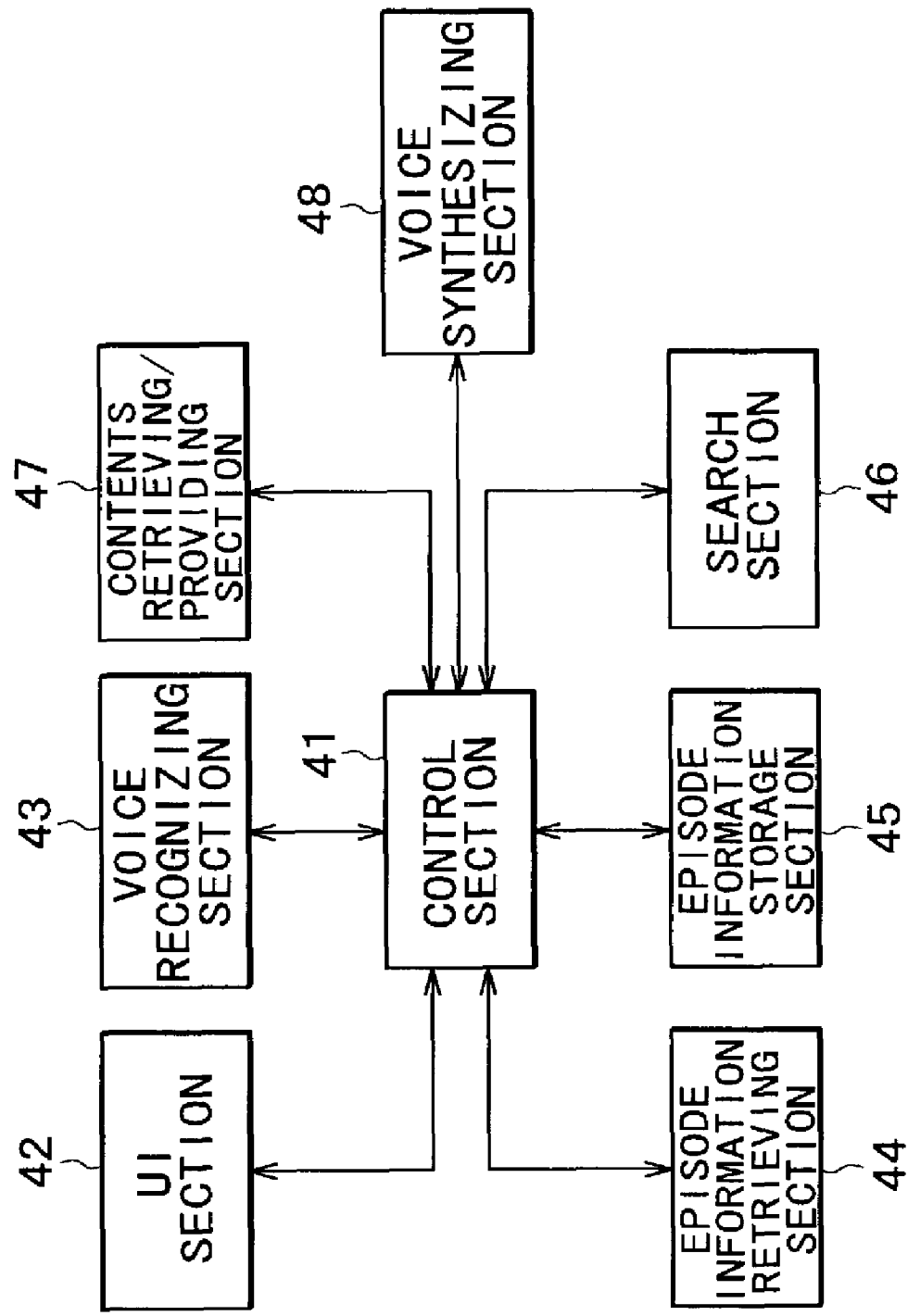
FIG. 4 is a block diagram illustrating functional blocks of an agent program installed on the episode server or an MD player shown in FIG. 1.
Figure 5:
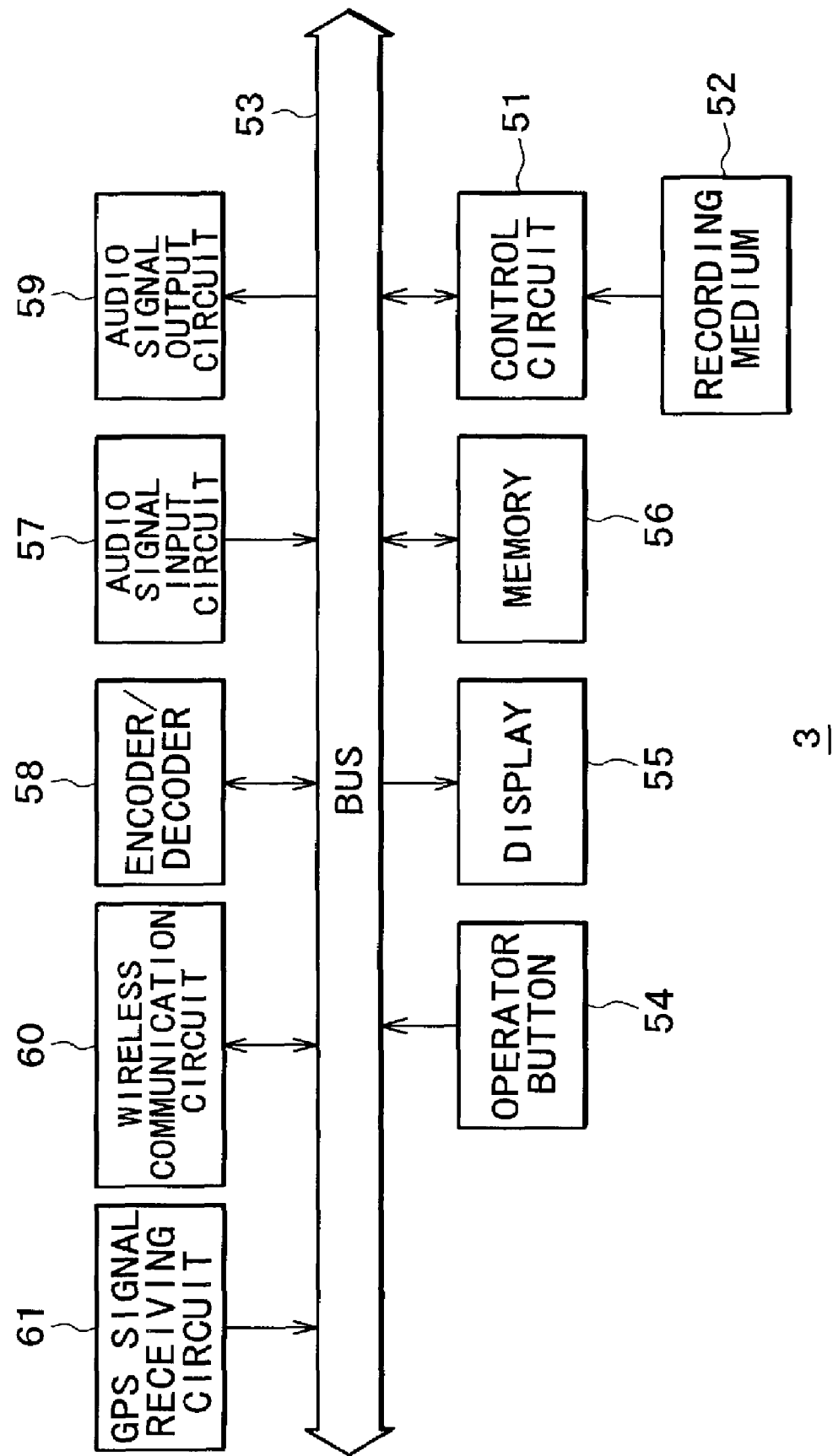
FIG. 5 is a block diagram illustrating an exemplary configuration of a portable player shown in FIG. 1.

The following describes exemplary configurations of apparatuses constituting the contents sharing management system associated with the invention with reference to FIGS. 3 through 5. Referring to FIG. 3, there is shown an exemplary configuration of the episode server 1.

The episode server 1 contains a CPU (Central Processing Unit) 21. The CPU 21 is connected to an input/output interface 25 via a bus 24. The bus 24 is connected to a ROM (Read Only Memory) 22 and a RAM (Random Access Memory) 23.

The input/output interface 25 is connected to a wireless communication circuit 26 for communicating data with the portable player 3 and so on in a wireless manner in accordance with the Bluetooth standard for example, a network communication circuit 27 for communicating music data and so on with the contents provider site 8 via the router 6 and the Internet 7 in accordance with TCP/IP (Transmission Control Protocol/Internet Protocol), operator buttons 28 arranged on a remote controller for entering operator commands by the user and the main body of the episode server 1, a display 29 for displaying an operator screen which provides user interface along with the operator buttons 28, a hard disk drive (HDD) 30 for storing the episode information retrieved from the portable player 3 and so on, a voice input circuit 31 into which user's voice is entered through its incorporated microphone for example, and a drive 32 for reading and writing data with recording media such as a magnetic disc 33, an optical disc 34, a magneto-optical disc 35, and a semiconductor memory 36.

An agent program to be executed by the CPU 21 is supplied to the episode server 1 as stored in the magnetic disc 33 (including a floppy disc), the optical disc 34 (including a CD-ROM and a DVD), the magneto-optical disc 35 (including an MD), or the semiconductor memory 36. The agent program is then read by the drive 32 to be installed in the hard disk drive 30, the installed agent program being loaded from the hard disk drive 30 to the RAM 23 for execution.

Referring to FIG. 4, there is shown a functional block diagram of the agent program. A control section 41 controls the functional blocks of the agent program, namely a user interface (UI) section 42, a voice recognizing section 43, an episode information retrieving section 44, an episode information storage section 45, a search section 46, a contents retrieving/providing section 47, and a voice synthesizing section 48. The user interface section 42 controls the operator buttons 28 and the display 29 to determine an operation performed by the user on an operator screen and outputs the decision to the control section 41.

The voice recognizing section 43 recognizes user's voice entered from the voice input circuit 31 and accordingly outputs words obtained by dividing-the voice into morphemes to the control section 41. The episode information retrieving section 44 stores own episode information in response to an event such as the reproduction of music data. Also, the episode information retrieving section 44 gets episode information from an other wirelessly connected apparatus. Further, the episode information retrieving section 44 identifies the name of location by matching the coordinate information of the obtained current location again the map data. The episode information storage section 45 generates a database of episode information by rearranging, in time series, the episode information obtained from the portable player 3 for example by the episode information retrieving section 44, storing the generated database into the hard disk drive 30.

The search section 46 searches the database stored on the hard disk drive 30 to identify the source apparatus of music data by use of the user operation determined by the user interface section 42 or the user's word obtained by the voice recognizing section 43 as a music data search condition. In addition, the search section 46 searches the database stored in the hard disk drive 30 to extract episode information by use of the word obtained from the voice recognizing section 43 as a condition for searching for the episode associated with the music data being reproduced.

The contents retrieving/providing section 47 makes the source apparatus (for example, the portable player 3) identified as a result of the search by the search section 46 supply the retrieved music data to the search requesting apparatus (for example, the component stereo set 2) in wireless communication. However, if the source apparatus (for example, the portable player 3) identified by the search section 46 cannot be wirelessly connected, the contents retrieving/providing section 47 gets the retrieved music data from the contents provider site 8 and supplies them to the search requesting apparatus (for example, component stereo set 2) in wireless communication.

On the basis of the episode information extracted by the search section 46 as a search result, the voice synthesizing section 48 synthesizes audio signals (for example, "I listened to this music with Mary in the park at noon today") representative of the episode associated with the music data being reproduced.

It should be noted that the agent program is installed on not only the episode server 1 but also the apparatuses, the component stereo set 2 through the MD player 5. However, not all the functional blocks, the user interface section 42 through the voice synthesizing section 48, of the agent program do not operate on the apparatuses, the episode server 1 through the MD player 5; the functional blocks operate in an adaptive manner in accordance with the hardware configuration of each of these apparatuses, the episode server 1 through the MD player 5.

Referring to FIG. 5, there is shown an exemplary configuration of the portable player 3. A control circuit 51 controls operator buttons 54, a display 55, a memory 56, an audio signal input circuit 57, an encoder/decoder 58, an audio signal output circuit 59, a wireless communication circuit 60, and a GPS signal receiving circuit 61 by executing a control program recorded to a recording medium 52. At the same time, the control circuit 51 realizes, on the portable player 3, the above-mentioned functions of the user interface section 42 through the voice synthesizing section 48 by reading the agent program from the recording medium 52 and executing it.

The operator buttons 54 are arranged on the main body of the portable player 3 and send the information about user's operation done to the control circuit 51 via a bus 53. The display 55 displays information such as track numbers of music to be reproduced, music titles, and so on, and an operator screen as user interface. The memory 56 constituted by a detachable recording medium stores music data, episode information, and map data for example.

The audio signal input circuit 57 digitizes an audio signal entered via a predetermined cable and supplies the digitized audio signal to the encoder/decoder 58 via the bus 53. The encoder/decoder 58 encodes the audio signal supplied from the audio signal input circuit 57 via the bus 53 in accordance with a predetermined encoding scheme (for example, ATRAC3). The resultant music data are stored in the memory 56. In addition, the encoder/decoder 58 decodes the music data read from the memory 56 and output the decoded music data to the audio signal output circuit 59 via the bus 53. The audio signal output circuit 59 converts the audio data entered from the encoder/decoder 58 via the bus 53 into an analog signal and output it to headphones for example.

The wireless communication circuit 60 communicates music data and episode information for example with the episode server 1, the component stereo set 2, and the MD player 5 for example located within the communication area in accordance with the Bluetooth standard for example. The GPS signal receiving circuit 61 computes the coordinate information (longitude, latitude, and altitude) of the location on the basis of the GPS signal transmitted from a GPS satellite.

It should be noted that, like the exemplary configuration of the portable player 3, the exemplary configurations of the component stereo set 2, the portable wireless terminal 4, and the MD player 5 each include a mutual wireless communication means like the wireless communication circuit 60 of the portable player 3 and executes the agent program by the control means such as the control circuit 51 of the portable player 3, as well as hardware provided in a commonly used component stereo set, of which detail descriptions will be skipped.

Figure 6:
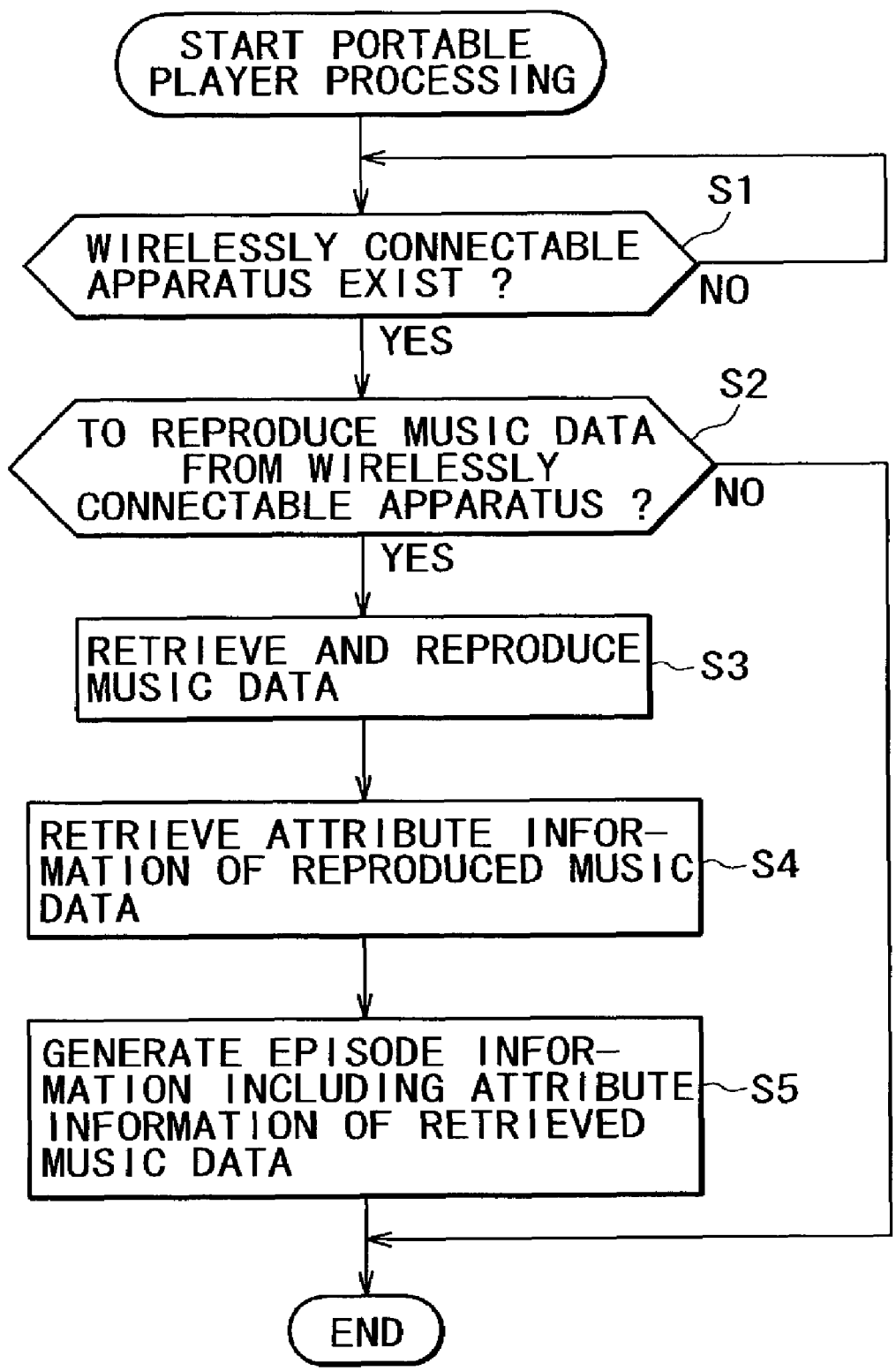
FIG. 6 is a flowchart describing a processing procedure for the portable player to reproduce music data supplied from an other apparatus.

The following describes the operation of the contents sharing management system. The description will be made, with reference to the flowchart shown in FIG. 6, on the processing by the portable player 3 of reproducing music data supplied from an other apparatus as with the reproduction of music data by the portable player 3 of the music data supplied from the MD player 5 in scene 1 shown in FIG. 2 for example.

In step S1, the wireless communication circuit 60 of the portable player 3 determines whether there is any wirelessly communicable apparatus within its communication area and waits until such apparatus is found. When any wirelessly communicable apparatus is found, the procedure goes to step S2. Subsequently, the description will be made by use of a case for example in which the MD player 5 exists in the communication area of the portable player 3 as shown in scene 2 of FIG. 2.

In step S2, the user interface section 42 of the agent program to be executed by the control circuit 51 of the portable player 3 (hereafter referred to as a user interface section 42-3) determines whether the user has performed an operation for specifying the reproduction of the music data supplied from the wirelessly communicable MD player 5. If the decision is Yes, the procedure goes to step S3.

In step S3, the contents retrieving/providing section 47 of the agent program to be executed by the control circuit 51 of the portable player 3 (hereafter referred to as a contents retrieving/providing section 47-3) gets music data from the MD player 5 via the wireless communication circuit 60 and outputs the music data to the encoder/decoder 58 via the bus 53. The encoder/decoder 58 decodes the entered music data. The resultant audio signal is outputted from the audio signal output circuit 59 to the headphones for example.

Upon the end of music reproduction, the episode information retrieving section 44 of the agent program to be executed by the control circuit 51 of the portable player 3 (hereafter referred to as an episode information retrieving section 44-3) gets the attribute information of the reproduced music data (music title, music ID, source apparatus (in this case, the MD player), and source apparatus user name) from the MD player 5 via the wireless communication circuit 60 in step S4. It should be noted that the attribute information of music data is set to music beforehand, obtained from a predetermined server via the Internet beforehand, or entered by user into the MD player 5 beforehand (provided that there may be items not yet set).

In step S5, the episode information retrieving section 44-3 puts the current date and time and location and the attribute information of the music data obtained in step S4 together to generate the episode information corresponding to the reproduction of the music data and stores the generated episode information into the memory 56.

It should be noted that the processes of steps S4 and S5 may be executed after starting the process of step S3 and before ending the reproduction of the music data; however, as described above, executing the processes of steps S4 and S5 after ending the reproduction of the music data can prevent the amount of the episode information to be stored in the memory 56 from increasing too much.

In step S2, if no operation by the user for specifying the reproduction of the music data supplied from the wirelessly communicable MD player 5 upon instruction of the reproduction of the music data stored in the portable player 3 for example is found, this processing comes to an end.

Figure 7:
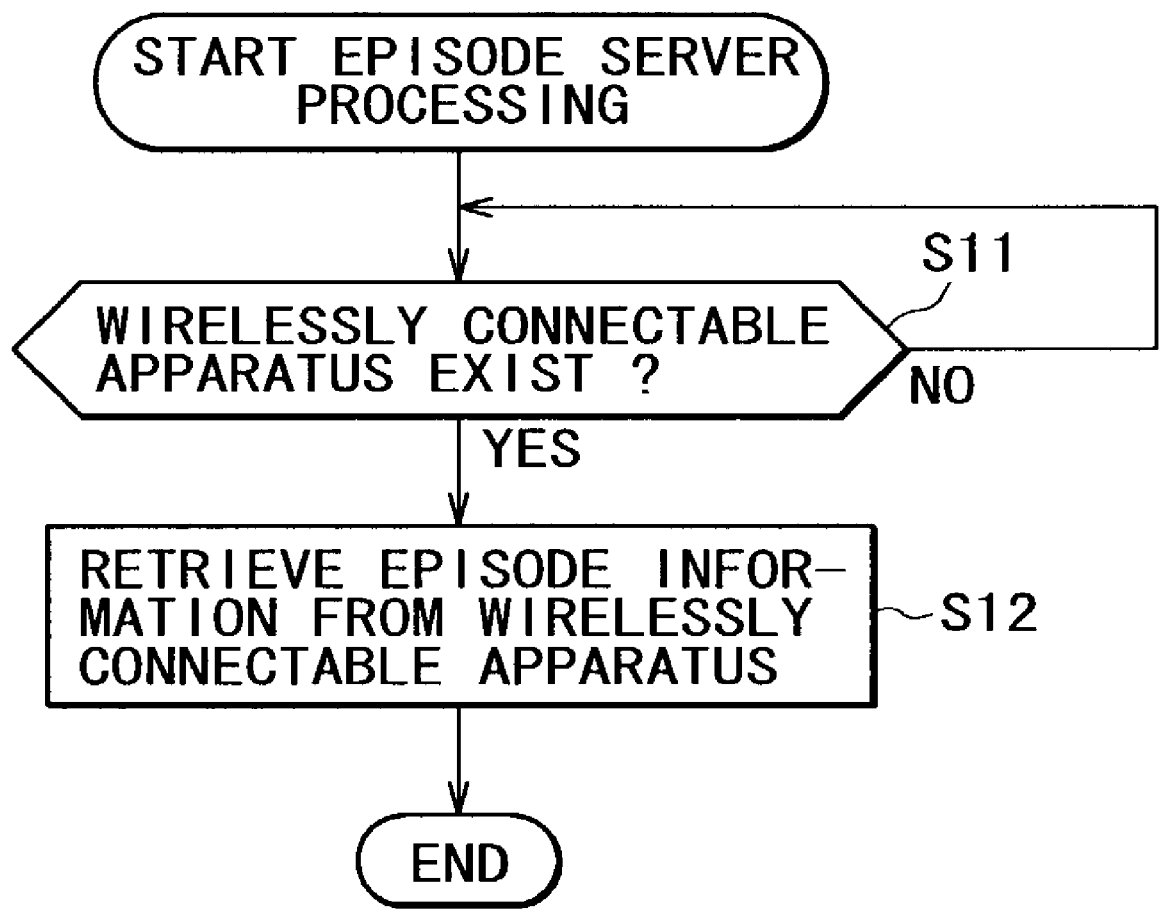
FIG. 7 is a flowchart describing a processing procedure for the episode server to get episode information from an other apparatus.

The following describes, with reference to the flowchart shown in FIG. 7, a processing procedure in which, as shown in scene 3 of FIG. 2 for example, the episode server 1 gets episode information from an other apparatus when John gets home and the portable player 3 gets in the communication area of the episode server 1.

In step S11, the wireless communication circuit 26 of the episode server 1 determines whether there is any wirelessly communicable apparatus within its communication area and waits until such apparatus is found. When such apparatus is found within its communication area, the procedure goes to step S12. The description will be made by use of an example in which the portable player 3 exists in the communication area of the episode server 1.

In step S12, the episode information retrieving section 44 of the agent program to be executed by the CPU 21 of the episode server 1 (hereafter referred to as an episode information retrieving section 44-1) gets episode information from the portable player 3 via the wireless communication circuit 26 and outputs the retrieved episode information to the episode information storage section 45 of the agent program to be executed in the episode server 1 (hereafter referred to as an episode information storage section 45-1).

It should be noted that the episode information to be generated in the component stereo set 2 for example existing within the communication area of the episode server 1 may be obtained by the episode server 1 every time it is generated or at every predetermined interval (for example, every 24 hours). The positional information of the episode information of stationary apparatus such as the component stereo set 2 may be set by the user as "living room of my home" for example.

The episode information of the portable player 3 entered in the episode information storage section 45-1 is arranged, in time series, along with the episode information, of an other apparatus (for example, the portable wireless terminal 4) than the portable player 3, stored in the episode information storage section 45-1 and these pieces of episode information are organized into a database, which is stored in the hard disk drive 30.

Referring to FIG. 8, there is shown one example of the episode information organized into a database which is stored in the hard disk drive 30 of the episode server 1.

For example, the episode information of the portable player 3 in scene 1 shown in FIG. 2 includes "12:00, Oct. 14, 2001" as event occurring date and time, "Kaihin Park" as the location, "EVERYDAY" as the title of the reproduced music, "MD Player" as the source apparatus of the reproduced music, "Portable Player" as the reproducing apparatus, and "Mary" as the accompanying person.

Further, for example, the episode information of the portable player 3 in scene 2 shown in FIG. 2 includes "15:30, Oct. 14, 2001" as the event occurring date and time, "Station Street Shopping Center" as the location, "ME12345D" as the ID of the reproduced music, "Portable Player" as the source apparatus of the reproduced music, and "Portable Player" as the reproducing apparatus.

Figure 9:
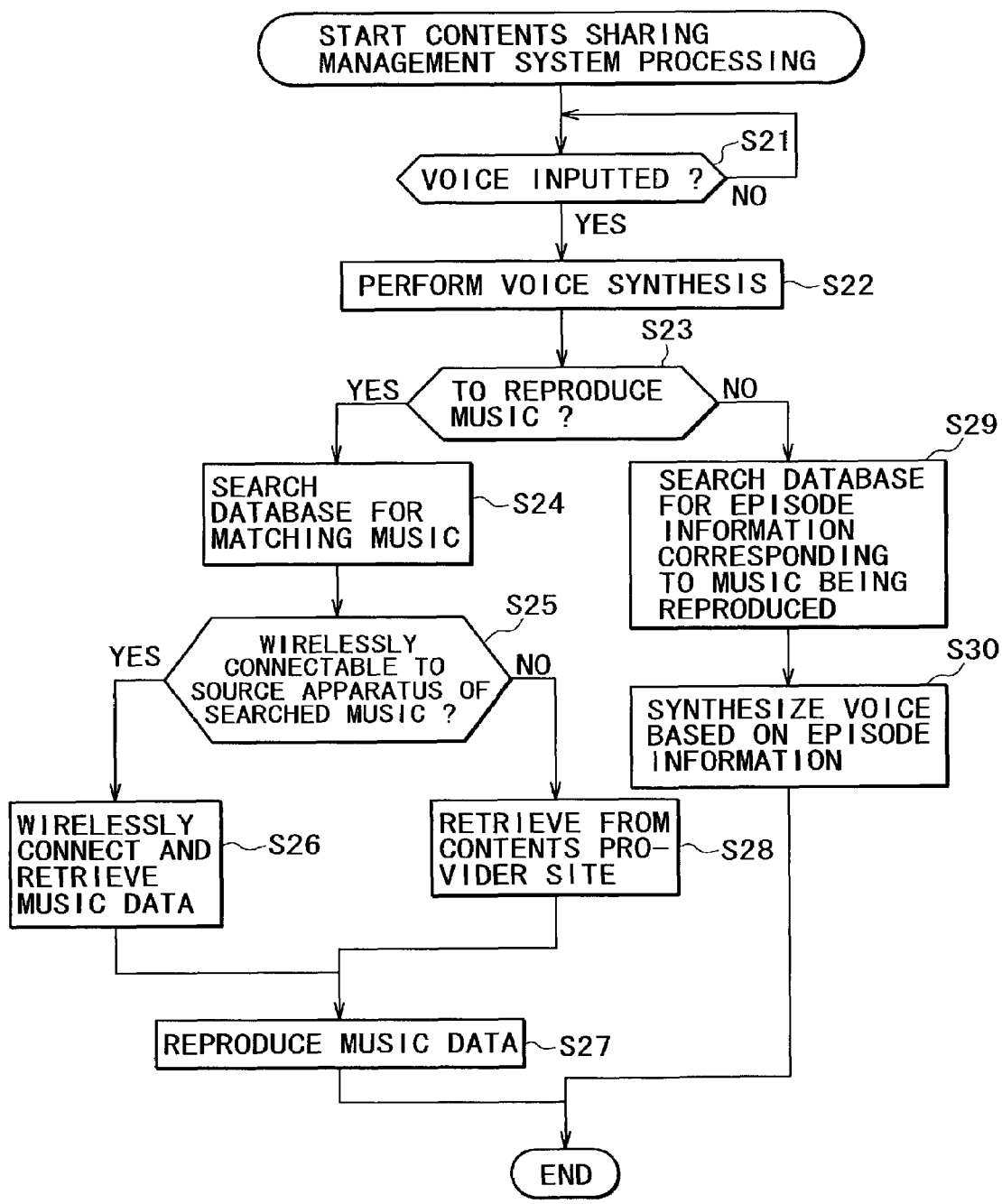
FIG. 9 is a flowchart describing a sequence of processing procedures by the contents sharing management system for reproducing music data in response to the utterance of user or transmitting episode information about the music data being reproduced.

The following describes, with reference to the flowchart shown in FIG. 9, a processing procedure by the contents sharing management system for reproducing music in response to user's utterance or transmitting episode information about the music being reproduced in response to user's utterance.

In step S21, the voice recognizing section 43 of the agent program to be executed in the component stereo set 2 (hereafter referred to as a voice recognizing section 43-2) determines whether voice input has been made from the user and waits until voice input is made. When the voice input is found, the procedure goes to step S22.

In step S22, the voice recognizing section 43-2 divides the voice input from the user into morphemes and outputs the resultant words to the control section 41 of the agent program to be executed in the component stereo set 2 (hereafter referred to as a control section 41-2).

For example, from user voice input "I want to listen to the music which I listened to with Mary in Kaihin Part around 12:00 noon today," words "Noon," "Around," "12:00," "Kaihin Park," "Mary," "Music," and "I want listen to" and so on are extracted.

In step S23, on the basis of the words entered from the voice recognizing section 43-2, the control section 41-2 determines whether the user is requesting the reproduction of music or the notification of episode information. If the user is requesting the reproduction of music, then the procedure goes to step S24.

In step S24, the control section 41-2 wirelessly communicates the words extracted in step S22 to the search section 46 of the agent program to be executed in the episode server 1 (hereafter referred to as a search section 46-1) as a search condition.

The search section 46-1 appropriately makes up for the supplied search condition. For example, if words "Noon, 12:00, Around, Kaihin Park, Mary, Music, I want to listen to" are supplied as search conditions, the search section 46-1 adds the date of today to these search conditions. Because "Around" is included in these search conditions, a time margin is given to "12:00" as a search condition. Further, the search section 46-1 searches the episode information database stored in the hard disk drive 30 by the complemented search conditions to identify the matching music and source apparatus.

In step S25, the contents retrieving/providing section 47 of the agent program to be executed in the episode server 1 (hereafter referred to as a contents retrieving/providing section 47-1) determines whether it can currently wirelessly connect to the music source apparatus identified in step S24. For example, if the music source apparatus is the portable player 3, the decision is Yes, so that the procedure goes to step S26.

In step S26, the contents retrieving/providing section 47-1 supplies the corresponding music data from the portable player 3, which is the source apparatus, to the component stereo set 2 by wireless communication. It should be noted that the music data from the portable player 3, which is the source apparatus, may be received by the episode server 1, which sends the received music data to the component stereo set 2.

In step S27, the component stereo set 2 reproduces the supplied music data to output the corresponding voice.

It should be noted that, if the music source apparatus identified in step S24 is found the MD player 5 for example in step S25, it indicates that the wireless connection thereto is disabled, so that the procedure goes to step S28.

In step S28, the contents retrieving/providing section 47-1 gets the corresponding music data from the contents provider site 8 on the Internet 7 and supplies the music data to the component stereo set 2 by wireless communication.

If plural pieces (for example, 2) of music data are identified as a search result in step S24, the first piece of music is reproduced by the processes of steps S25 through S27. If, listening to the reproduced first music, the user utters "No," this voice is recognized and the reproduction is switched from the first music to the second music.

If the user utters "No" to the second music, it is recognized that the second music is desired by the user to continue its reproduction, the episode information about the reproduction of the second music being stored in the component stereo set 2.

If music (for example, "EVERYDAY") is being reproduced and the entered user's utterance is "What is the episode of this music?" for example in step S21, then word "episode" is extracted as a search condition in step S22. In this case, the request for transmitting episode information is determined in step S23, upon which the procedure goes to step S29.

In steps S29, the episode information retrieving section 44 of the agent program to be executed in the component stereo set 2 (hereafter referred to as an episode information retrieving section 44-2) gets the title and ID (or one of them) of the music being reproduced. By use of the retrieved music title or ID as a search condition, the control section 41-2 sends the search condition to the search section 46-1 of the episode server 1 by wireless communication.

The search section 46-1 searches for the episode information which matches the received search condition. The retrieved episode information is supplied to the voice synthesizing section 48 of the agent program to be executed in the component stereo set 2 (hereafter referred to as a voice synthesizing section 48-2) by wireless communication.

For example, if the search condition is music title "EVERYDAY," the search section 46-1 searches the database shown in FIG. 8 for the event information with event date and time "12:00, Oct. 14, 2001," location "Kaihin Park," source apparatus of reproduced music "MD player," reproducing apparatus "Portable player," and accompanying person "Mary" and supplies the retrieved event information to the voice synthesizing section 48-2.

In step S30, on the basis of the episode information supplied from the episode server 1, the voice synthesizing section 48-2 of the component stereo set 2 synthesizes audio signal "The music being reproduced is what I listened to with Mary in Kaihin Park at noon, Oct. 14, 2001" for example and sounds the voice from the speaker. It should be noted that character string "The music being reproduced is what I listened to with Mary in Kaihin Park at noon, Oct. 14, 2001" may also be displayed for visual presentation to the user.

As described and according to the contents sharing management system associated with the invention, even if the user cannot correctly remember the title or source apparatus of desired music, the user can reproduce it only by uttering fragmentary information thereabout. In addition, because the episode information about music which has been listened to can be transmitted to the user, it may give the user a chance of widening his interest by remembering the past or triggering music search.

As described, the contents sharing management system not only operates by recognizing user's utterance, but also causes the user to search for music for reproduction through the operator screen displayed on the display 29 of the episode server 1 or the display 55 of the portable player 3.

Referring to FIG. 10, there is shown an exemplary display on the operator screen on the display 29 of the episode server 1 or the display 55 of the portable player 3 for example. The operator screen shows a list of stored episode information. To specify a particular piece of music to be reproduced, the user vertically moves a slider 72 shown at the left end of the screen to the desired piece of music for selection, for example.

Also, the episode information may be narrowed down by making the user select the displayed information (for example, Kaihin Park and Mary) by operating a cursor 71 to extract only the event information which includes the selected information. In this case, plural pieces of information may also be selected at the same time.

Further, a box in which the user can enter character strings may be arranged on the operator screen. The entered character strings may be voice-recognized and words may be extracted from the entered character strings for use as a search condition.

In the above-mentioned embodiment, the portable player 3 is directly connected to the episode server 1 in a wireless manner. It is also practicable to connect the portable player 3 to the episode server 1 via a network represented by the Internet 7.

As described, the apparatuses, the component stereo set 2 through the MD player 5, have each the agent program installed as with the episode server 1, so that the above-described processing by the episode server 1 may be executed by the component stereo set 2 to omit the episode server 1 from the configuration of the contents sharing management system.

Further, because the agent program is installed on each of the apparatuses, the component stereo set 2 through the MD player 5, the following operations may be realized.

For example, the apparatuses, the component stereo set 2 through the MD player 5, may accept the search conditions entered by the user to search for specified music data by referencing the episode information stored in these apparatuses.

Still further, the apparatuses, the component stereo set 2 through the MD player 5, may get the episode information from each other and stored the obtained episode information with the own episode information to search for the specified music data by referencing these pieces of episode information.

Moreover, the apparatuses, the component stereo set 2 through the MD player 5, may accept the search conditions entered by the user and transmit the accepted search conditions to each other to request for search. When the specified music data are identified as a result of the search, the apparatuses, the component stereo set 2 through the MD player 5 may get the music data from the recording media loaded on themselves, from each other which is wirelessly connectable, or from the contents provider site 8 on the Internet 7 and reproduce the obtained music data.

In the contents sharing management system associated with the invention, all the component apparatuses are interconnected by wireless communication technologies such as Bluetooth. It will be apparent that these apparatuses may also be interconnected by use of predetermined cables to transfer contents data and episode information.

It should be noted that the steps describing the programs recorded on a recording medium include herein not only the processes which are executed according to the described sequence in a time series manner, but also the processes which are concurrently or discretely executed.

The embodiment of the invention has been described by use of music as contents data. It will be apparent that the contents data may also include still pictures, moving pictures, and character information. The contents data may be provided in storage media or the internal memories of apparatuses or as streaming contents data supplied via a communication network such as the Internet.

The episode information about contents data stored in each reproducing apparatus may also be registered for searching in the episode server at home via a communication network such as the Internet.

The term "system" herein used denotes the entire equipment composed of plural apparatuses.

As described and according to the invention, the reproducing apparatus and method and the first program gather and store the episode information about contents data when they are reproduced and transmit the stored episode information to other electronic apparatuses. Consequently, the novel constitution allows to automatically construct a database of contents data which are distributed over plural reproducing apparatuses.

As described and according to the invention, the reproducing apparatus and method and the second program store the episode information transmitted from connected reproducing apparatuses, search for the contents data matching the search condition transmitted from connected reproducing apparatuses by referencing the stored episode information, and supply the retrieved contents data to reproducing apparatuses. Consequently, the novel constitution allows to automatically construct a database of the contents data distributed over plural reproducing apparatuses and search for contents data on the basis of the fragmentary memory of users.

While the preferred embodiments of the present invention have been described using specific terms, such description is for illustrative purposes only, and it is to be understood that changes and variations may be made without departing from the spirit or scope of the appended claims.

What is claimed is:

1. A method for reproducing content data, comprising:
    performing a particular episode of outputting the content data, including:
        receiving content data transmitted from a first apparatus, wherein the first apparatus stores the content data, and outputting the transmitted content data to an output device on a second apparatus;
    storing episode information associated with the particular episode of outputting the content data, the episode information including data that includes at least a title or ID of the content data and one or more of: a date and time of the particular episode, a location at which the particular episode occurred, and information about the first apparatus;
    requesting the content data, subsequent to performing the particular episode of outputting the content data, based on one or more of the episode information data without using the title or ID of the content data;
    retrieving the content data based on the request; and
    reproducing the retrieved content data.

2. The method of claim 1, wherein performing the particular episode of outputting content data comprises at least one of: outputting audio content data and displaying moving picture content data, and storing the episode information further comprises storing episode information associated with at least one of: the outputting audio content data and the displaying moving picture content data.

3. The method of claim 1, wherein receiving the content data transmitted from the first apparatus further comprises receiving the content data wirelessly.

4. The method of claim 1, wherein the episode information data further includes one or more of identification information identifying the first apparatus, and information about an owner or user of the first apparatus.

5. The method of claim 1, wherein retrieving the content data further comprises:
    retrieving the content data from a source other than the first apparatus or the second apparatus.

6. The method of claim 1, wherein reproducing the retrieved content data comprises one or more of:
    storing the retrieved content data in a memory; and
    outputting the retrieved content data to an output device.

7. A recording medium having stored thereon a computer-readable program having instructions that instruct a first apparatus to perform a method for reproducing content data, the method comprising:
    performing a particular episode of outputting content data by at least receiving content data transmitted from a source apparatus that stores the content data and outputting the transmitted content data to an output device on the first apparatus;
    storing episode information associated with the particular episode of outputting the content data, the episode information including data that includes at least a title or ID of the content data and one or more of: a date and time of the particular episode, a location at which the particular episode occurred, and information about the source from which the content data for the particular episode was received;
    receiving the content data, subsequent to performing the particular episode of outputting the content data, based on a request that includes at least one of the date and time of the particular episode, the location at which the particular episode occurred, and the information about the source from which the content data for the particular episode was received; and
    reproducing the received content data.

8. The recording medium of claim 7, wherein the method further comprises:
    performing the particular episode of outputting content data by at least one of: outputting audio content data and displaying moving picture content data, and storing the episode information by storing episode information associated with at least one of: the outputting audio content data and the displaying moving picture content data.

9. The recording medium of claim 7, wherein the method further comprises:
    receiving the content data transmitted from the source apparatus wirelessly.

10. The recording medium of claim 7, wherein the episode information data further includes one or more of identification information identifying the source apparatus of the content data for the particular episode of outputting the content data, and information about an owner or user of the source apparatus of the content data for the particular episode of outputting the content data.

11. The recording medium of claim 7, wherein the method further comprises:
    receiving the content data from a source other than the source apparatus or the first apparatus.

12. The recording medium of claim 7, wherein the method further comprises:
    storing the received content data in a memory; and
    outputting the content data to an output device.

13. An apparatus for reproducing content data, the apparatus including a recording medium having recorded theron a control program, the apparatus comprising:
    a communication circuit configured to receive content data transmitted from a source apparatus that stores the content data;
    an output device configured to output the transmitted content data, thereby performing a particular episode of outputting the content data;
    a memory configured to store episode information associated with the particular episode of outputting the content data by the apparatus, the episode information including data that includes at least a title or ID of the content data and one or more of: a date and time of the particular episode, a location at which the particular episode occurred, and the source from which the content data was received for the particular episode;

the control program configured to permit the apparatus to, subsequent to the episode of outputting the content data, receive the content data from another apparatus, based on at least one of the date and time of the particular episode, the location at which the particular episode occurred, and the information about the source from which the content data for the particular episode was received; and a reproduction device configured to reproduce the received content data.

14. The apparatus of claim 13, further comprising:

one or more output devices configured to output the particular episode of content data by at least one of: outputting audio content data and displaying moving picture content data, wherein the memory is further configured to store episode information associated with at least one of: the outputting audio content data and the displaying moving picture content data.

15. The apparatus of claim 13, wherein the communication circuit is a wireless communication circuit configured to receive the content data wirelessly.

16. The apparatus of claim 13, wherein the episode information data further includes one or more of: identification information identifying the source apparatus of the content data for the particular episode of outputting the content data, and information about an owner or user of the source apparatus of the content data for the particular episode of outputting the content data.

17. The apparatus of claim 13, wherein the reproduction device further includes one or more of:

a memory configured to store the received content data; and the output device.

18. A system comprising:

a first user apparatus including a storage for storing content data;

a second user apparatus configured to communicate with the first apparatus and to output content data stored on the first user apparatus; and a storage on the second user apparatus configured to store episode information associated with a particular episode of outputting the content data at the second user apparatus, wherein the episode information includes at least a title or ID of the content data, and one or more of: a date and time of the particular episode, a location at which the particular episode occurred, and information about the first user apparatus; wherein the second apparatus is configured to transmit the episode information to a third apparatus; and the second apparatus is configured to receive the content data based on one or more of the episode information data included in a request that does not include the title or ID of the content data.

* * * * *